United States Patent

[11] 3,596,606

[72] Inventors Courtland N. Smith, Jr.
 Glen Ridge;
 Edward L. Verhagen, Rahway, both of, N.J.
[21] Appl. No. 774,748
[22] Filed Nov. 12, 1968
[45] Patented Aug. 3, 1971
[73] Assignee Sherman Car Wash Equipment Co.
 Palmyra, N.J.

[54] VEHICLE CONVEYOR
 5 Claims, 10 Drawing Figs.
[52] U.S. Cl. ............................................. 104/172
[51] Int. Cl. ............................................. B65g 17/38
[50] Field of Search ............................................. 104/172, 176; 193/37; 295/34; 308/RB; 68/259

[56] References Cited
UNITED STATES PATENTS
| | | | |
|---|---|---|---|
| 1,255,495 | 2/1918 | Wright | 68/259 |
| 948,643 | 2/1910 | Coulthard | 308/RB |
| 1,580,615 | 4/1926 | Landahl | 193/37 |
| 1,596,166 | 7/1926 | Everett | 295/34 |
| 1,688,677 | 10/1928 | Winter | 193/37 |
| 2,007,910 | 7/1935 | Stephens | 193/37 |
| 2,107,465 | 2/1938 | Borggaard | 104/172 |
| 3,053,368 | 9/1962 | Klahn | 193/37 |
| 3,058,433 | 10/1962 | Hurst | 104/172 |

Primary Examiner—Arthur L. La Point
Assistant Examiner—Robert Saifer
Attorney—Seidel and Gonda ABSTRACT: A vehicle conveyor is provided which includes pusher assemblies for contact with the tires of a vehicle. The pusher assemblies are supported by a shaft having wheels in rolling contact with a track. Wheel flanges are provided on the pusher assemblies to prevent lateral shifting with respect to the track. The pusher assemblies may be removably coupled to their conveyor chain with a quick release mechanism.

PATENTED AUG 3 1971

INVENTORS
COURTLAND N. SMITH, JR.
EDWARD L. VERHAGEN

BY
Seidel & Gonda

ATTORNEYS

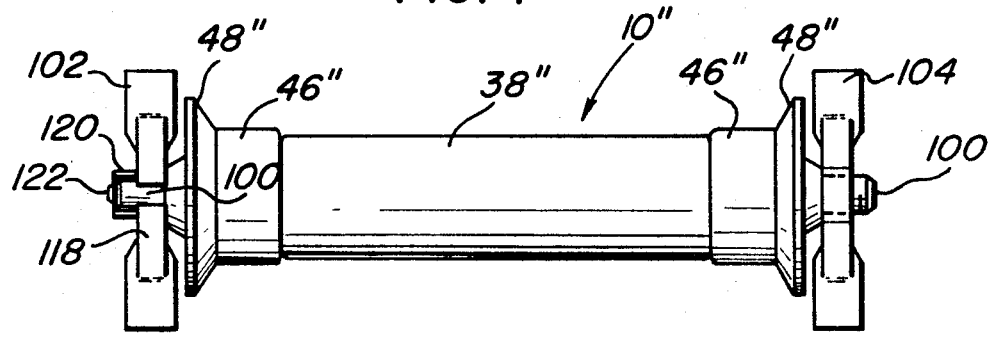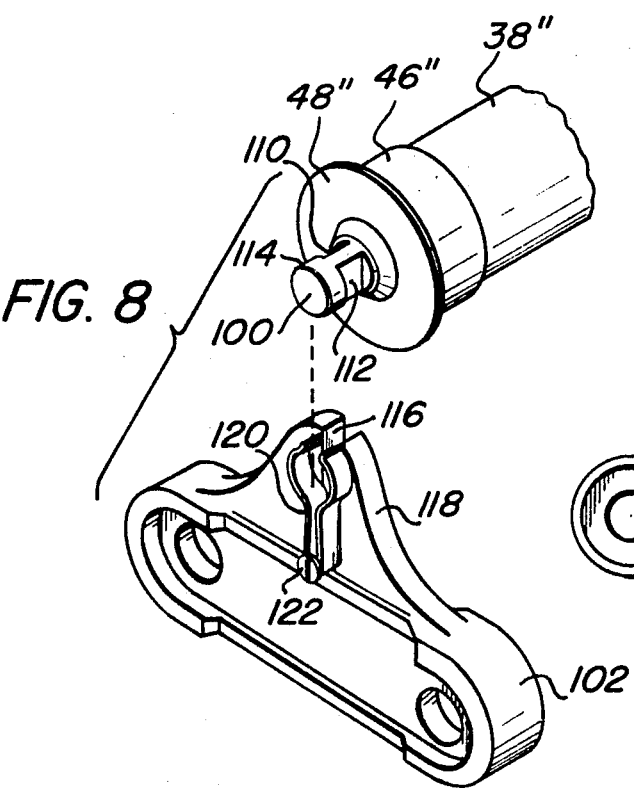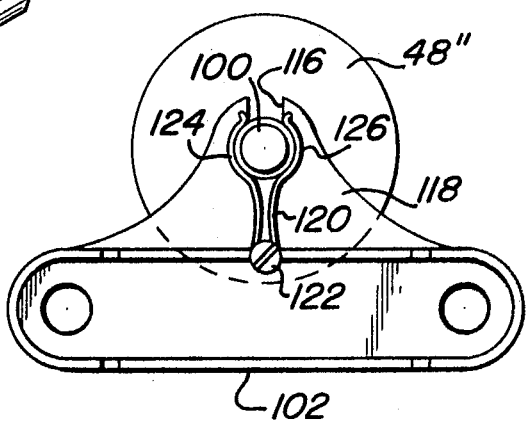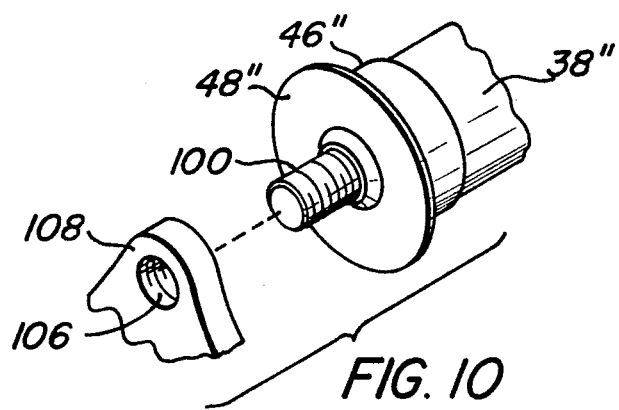

VEHICLE CONVEYOR

This invention relates to a vehicle conveyor, and more particularly, to a conveyor for engagement with the tires of a vehicle to push the vehicle along a guided path. A typical environment for such a unit is in a car washing installation with the conveyor mounted in or on a floor.

The conveyor includes pusher assemblies each including a roller rotatably supported on a shaft. The ends of the shaft are connected to and support endless chains disposed on opposite sides of a track. Flanged wheels are rotatably supported on the shaft adjacent opposite ends of the roller. Each wheel has a portion in rolling contact with the track and each wheel has a peripheral flange which extends over the edge of the track. The distance between the flanges is greater than the distance across the track.

Vehicle conveyors constructed in this manner and as will be described in greater detail hereinafter provide certain advantages over known conveyors such as the conveyor disclosed in U.S. Pat. No. 3,058,433. The conveyor of the present invention obviates the possibility of the assembly sliding laterally with respect to the track. Also, the present invention obviates the possibility of the conveyor chain rubbing against the sides of the track which heretofore has caused wear and a squealing noise which is objectionable. Further, the present invention provides a conveyor wherein the pusher assembly is maintained true for tracking purposes. Heretofore, there has always been a tendency of the assembly to wander. In addition, the present invention utilizes an assembly wherein there is true rolling friction with no sliding friction.

In accordance with the present invention, the pusher assembly includes a roller which may be readily disengageable with respect to the conveyor chains. This feature is desirable so as to cause quick disengagement with the chain should an obstruction such as a man's foot be introduced between the roller and the floor. The removable feature of the pusher assembly has other advantages such as when the conveyor is inoperative. In that event, the pusher assemblies may be removed so that automobiles may be driven through the car wash without encountering obstructions created by the pusher assemblies still attached to the conveyor chains. Removability of the pusher assemblies may be vertical, horizontal, and/or a combination of the two.

It is an object of the present invention to provide a novel vehicle conveyor. It is another object of the present invention to provide a vehicle conveyor which will properly track, is not prone to jumping, and can be operated with less wear than those proposed heretofore.

It is another object of the present invention to provide a vehicle conveyor which is not prone to allow wheels thereon to interfere with the car tires.

It is another object of the present invention to provide a conveyor that will not slide while being constructed in a manner which is simple, economical and reliable.

It is another object of the present invention to provide a novel vehicle conveyor having readily removable pusher assemblies.

Other objects will appear hereinafter.

For the purpose of illustrating the invention, there are shown in the drawings forms which are presently preferred; it being understood, however, that this invention is not limited to the precise arrangements and instrumentalities shown.

FIG. 7 is a top plan view of still another embodiment of the present invention.

FIG. 8 is an exploded partial perspective view of the embodiment shown in FIG. 7.

FIG. 9 is a side elevation of the embodiment shown in FIG. 7.

FIG. 10 is an exploded partial perspective showing the side of the pusher opposite to that illustrated in FIG. 8.

Figure 1:
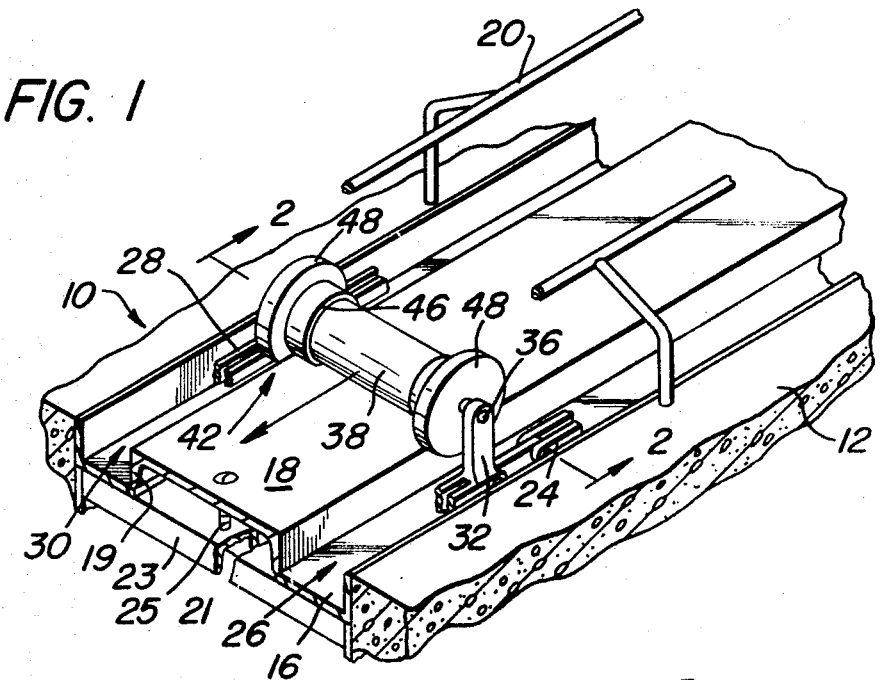
FIG. 1 is a partial perspective view of a conveyor in accordance with the present invention.

Referring to the drawing in detail, wherein like numerals indicate like elements, there is shown a portion of a vehicle conveyor in accordance with the present invention designated generally as 10. The conveyor 10 may be mounted in or on a floor 12.

Figure 2:
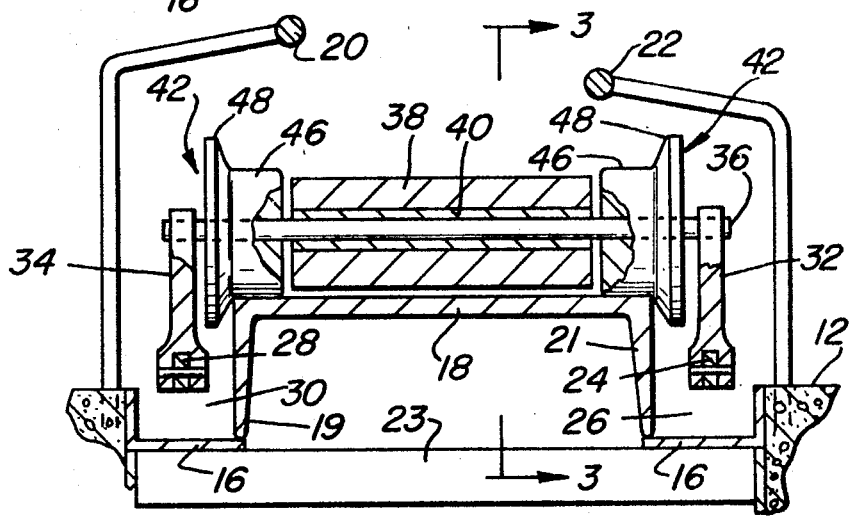
FIG. 2 is a sectional view taken along the line 2—2 in FIG. 1.

As shown more clearly in FIG. 2, the floor 12 is provided with a channel so that the conveyor may be mounted therein. To accommodate the conveyor, a housing 14 is provided within the channel in floor 12. The housing 14 includes horizontally disposed walls 16 extending towards each other. A track 18 is provided having legs 19 and 21 which are supported by the walls 16. Support channels 23 are provided beneath and support the walls 16 at spaced points therealong. The track 18 is bolted to certain ones of the channels 23 by bolts 25.

Along one side of the channel in floor 12, there is provided an outside guide rail 20. Along the other side of the channel, there is provided an inside guide rail 22. The rails 20 and 22 define a guided path along which the wheel of a vehicle will be pushed.

An endless conveyor chain 24 is disposed within the space 26 above floor 16 as shown more clearly at the right hand end of FIG. 2. The return run or bottom run of chain 24 will be disposed within the housing 14 below space 26. An endless conveyor chain 28, similar to chain 24, is disposed within space 30 above floor 16 as shown more clearly at the left hand end of FIG. 2. The return run for chain 28 will likewise be disposed within housing 14 below the space 30.

At spaced points along the chain 24, there is provided upright lugs 32. At spaced points along the chain 28, there is provided upright lugs 34. Only one set of lugs is shown in the drawing. The conveyor 10 includes a plurality of pusher assemblies at spaced points therealong. Each pusher assembly includes a shaft 36 disposed above the track 18 and having its ends positioned so as to support the lugs 32 and 34 and thereby support the chains 24 and 28. Each assembly includes a pusher roller 38 rotatably supported by the shaft 36.

Each pusher assembly includes a wheel 42 adjacent opposite ends of the shaft 36. Each wheel 42 includes a hub portion 46 having a radially outwardly directed flange 48. The flanges 48 extend downwardly beyond the edge of track 18. The distance between the flanges 48 is somewhat greater than the distance across the track 18. The hub portions 46 of each wheel 42 are in rolling engagement with the top of the track 18.

It will be noted that the roller 38 does not contact the track 18. If the pusher assembly slides axially with respect to the shaft 36, the flanges 48 will make contact with the legs 19 or 21 and prevent the chains 24 and 28 from contacting any portion of the track 18. If desired, the roller 38 may be provided with a sleeve bearing 40, but this is optional.

Figure 3:
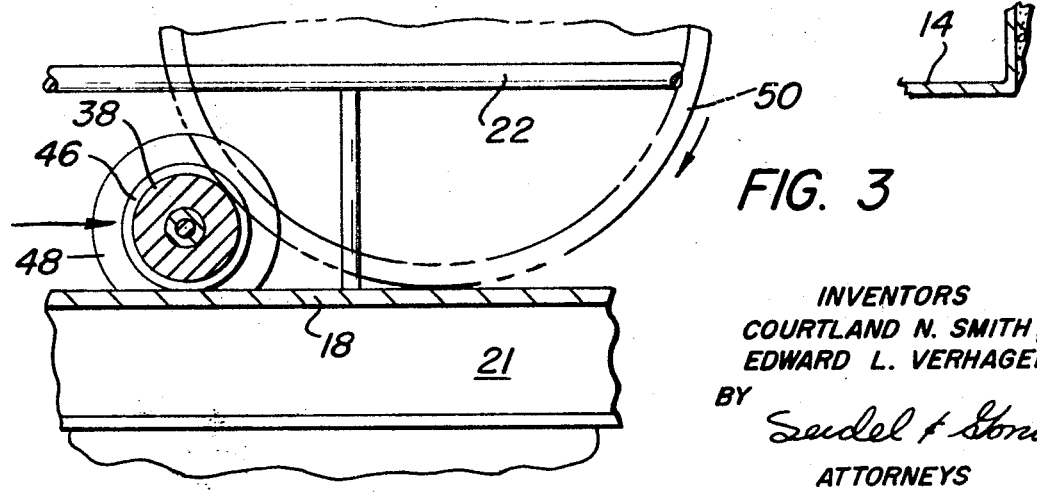
FIG. 3 is a sectional view taken along the line 3—3 in FIG. 2.

Referring to FIG. 3, it is assumed that the pusher assembly is moving from left to right and is being pulled along the track by the chains 24 and 28. A power means, not shown, is coupled to the chains to drive the same at a uniform speed. When the roller 38 contacts the tire 50 on a vehicle, it pushes the vehicle along the guided path defined by the rails 20 and 22. In doing so, the tire 50 rotates in a clockwise direction. The wheels 42 likewise rotate in a clockwise direction. However, the roller 38 rotates in a counterclockwise direction due to its pushing contact with the tire 50.

Figure 4:
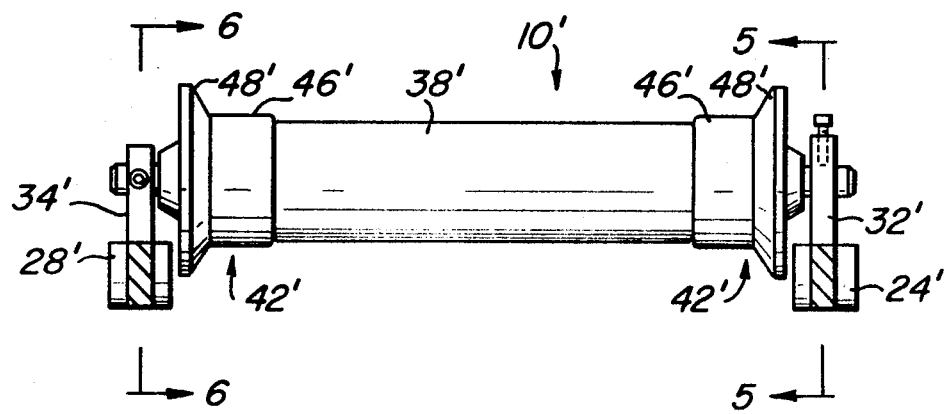
FIG. 4 is a front elevation view of another embodiment of the conveyor of the present invention.
Figure 5:
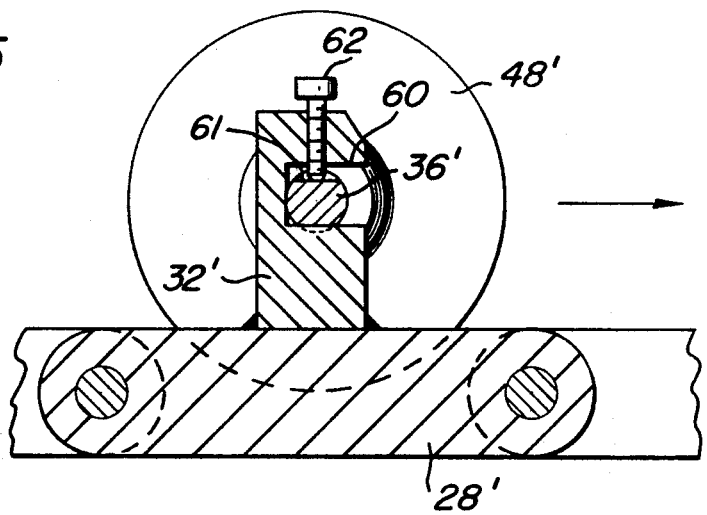
FIG. 5 is a sectional view taken along the line 5—5 in FIG. 4.
Figure 6:
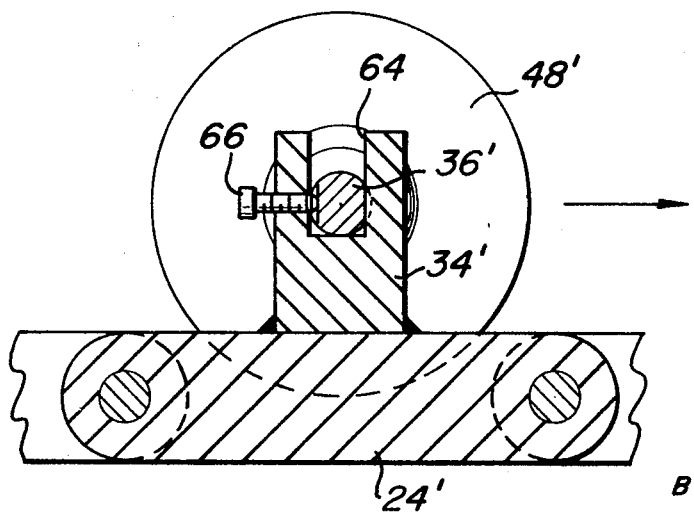
FIG. 6 is a sectional view taken along the line 6—6 in FIG. 4.

Referring to FIGS. 4—6, there is illustrated another conveyor of the present invention designated generally as 10'. The conveyor' is identical with the conveyor 10 except as will be made clear hereinafter. Accordingly, corresponding primed numerals are provided on corresponding structure.

Conveyor 10' differs from conveyor 10 in that the pusher assembly is readily disconnectable with respect to the chains 24' and 28'. This disconnection may be in a vertical or horizontal direction. For purposes of illustration, there is illustrated in FIGS. 4—6 a disconnection which includes separating the pusher assembly from one chain in a vertical direction and separating the other end of the assembly from the other chain in a horizontal direction. If desired, the entire pusher assembly may be disconnected in a vertical or horizontal direction.

As shown more clearly in FIG. 5, the lug 32' is provided with a notch 60 facing in the direction of movement of the conveyor as shown by the arrow in FIG. 5. One end of the shaft 36' is received within the notch 60. A setscrew or bolt 62 is threadedly coupled to the lug 32' and engages one of two flats 61 milled on the shaft 36'.

As shown more clearly in FIG. 6, lug 34' is provided with a notch 64 which extends upwardly perpendicular to the direction of movement of the pusher assembly as indicated by the arrow in FIG. 6. A setscrew or bolt 66 is threadedly coupled to the lug 34' and engages one of two flats milled on the shaft 36'. The roller 38' would be ineffective for pushing a vehicle if the end of shaft 36' adjacent lug 34' is raised upwardly out of notch 64 or the opposite end of shaft 36' is moved out of notch 60. Conveyor 10' is otherwise identical with conveyor 10.

Referring now to FIGS. 7, 8, 9 and 10, there is illustrated yet another embodiment of the present invention designated generally as 10''. The conveyor 10'' is identical with the conveyor 10 except insofar as is made clear hereinafter. Accordingly, corresponding double primed numerals are used to designate like structure.

Conveyor 10'' differs from conveyor 10 in that the pusher assembly is readily disconnectable from other links which connect it to the conveyor chains. Hubs 46'' for the flanges 48'' are supported in conveyor chain links 102 and 104. The links 102 and 104 are connected to other chain links by pins (not shown).

The shaft 100 is connected to the link 104 by threadedly engaging it in a threaded opening 106 in the lug 108. Thus, the threaded end of the shaft 100 may be disconnected from the link 104 if necessary. However, this is not a quick disconnect in the sense that it will not become disengaged under pressure such as a mechanic's foot or some other object in the path of the pusher.

As shown in FIGS. 7 and 8, the end of shaft 100 opposite the threaded end is provided with two milled flat portions 110 and 112 which are spaced inwardly from the terminal portion 114 of the shaft. The milled flats 110 and 112 slidably fit within a slot 116 in the lug 118 on the link 102. The milled flat portions 110 and 112 prevent it from rotating. The shaft can, however, be disengaged from the lug 118 by moving it upwardly out of the slot 116. To prevent this from happening, except when desired, a U-shaped spring clip 120 is fixed to the outer side of the lug 118 by the threaded fastener 122. The clip 120 is made of a spring steel which is formed in the manner such that the curved ends 124 and 126 are normally biased toward each other. Thus, the ends 124 and 126 engage the end portion 114 of shaft 100 and retain the shaft within the slot 116. The spring force provided by the clip 120 prevents accidental disengagement from the slot 116. However, the spring force is small enough so that is a man's foot or some other object should be placed in the path of the pusher roller 38, the shaft will readily be biased out of the slot 116 against the spring force of the clip 120. The conveyor chain, of which link 104 forms a part, readily twists when the shaft 100 is biased out of the slot 116 in the lug 118.

The present invention may be embodied in other specific forms without departing from the spirit or essential attributes thereof and, accordingly, reference should be made to the appended claims, rather than to the foregoing specification as indicating the scope of the invention.

We claim:

1. A vehicle conveyor for engagement with the tire of a vehicle to push the vehicle along a guided path, comprising a floor, a track supported by said floor and having a planar upper surface to receive the support the tire, means defining a space along the side edges of said track, endless chain means in each of said spaces, said chain means including opposed spaced lugs, a plurality of shafts supported at their opposite ends by said opposed lugs, each of said shafts rotatably supporting a pusher roller at an elevation above said track which is greater than the radius of said roller, wheels on said shaft in rolling contact with said upper surface of said track, each of said wheels including a hub portion and a flange having a diameter greater than the diameter of said hub portion to extend beyond the edge of said track, said flanges being in rolling contact with the side edge portions of said track to maintain said pusher rollers in vertical alignment with said track, at least one of said opposed lugs having a notch for receiving one end of said shaft, and retention means for retaining said shaft in said notch and releasing said shaft upon application of a predetermined overload for said shaft in a direction toward the opening of said notch.

2. A conveyor in accordance with claim 1 wherein said retention means is a spring clip for engaging said shaft.

3. A conveyor in accordance with claim 1 wherein said notch opens vertically, the width of said notch being less than the diameter of said shaft, said shaft having flat portions adjacent the end approximately equal to the width of said notch whereby said shaft may slide into said notch, and said retention means is a spring clip positioned to engage a portion of said shaft.

4. A conveyor in accordance with claim 1 wherein the opposite end of said shaft is threadedly engaged in a threaded opening in the opposite lugs of said set.

5. A conveyor in accordance with claim 1, wherein said retention means comprises a flat portion of said shaft, and setscrews on said lugs adapted to engage said flat portions.